United States Patent [19]

Basavanhally et al.

[11] Patent Number: 5,185,846
[45] Date of Patent: Feb. 9, 1993

[54] OPTICAL FIBER ALIGNMENT APPARATUS INCLUDING GUIDING AND SECURING PLATES

[75] Inventors: Nagesh R. Basavanhally, Trenton; Richard Borutta, Lawrenceville; Theodore Sizer, II, Little Silver; James A. Walker, Howell, all of N.J.

[73] Assignee: AT&T Bell Laboratories, Murray Hill, N.J.

[21] Appl. No.: 861,694

[22] Filed: Apr. 1, 1992

Related U.S. Application Data

[62] Division of Ser. No. 705,229, May 24, 1991, Pat. No. 5,135,590.

[51] Int. Cl.$^5$ .............................................. G02B 6/04
[52] U.S. Cl. ...................................... 385/137; 385/51; 385/52; 385/114; 385/115; 385/77; 385/120
[58] Field of Search ................ 385/51, 55, 59, 60, 385/65, 115, 114, 129, 130, 137, 120, 50, 80, 54, 52, 77

[56] References Cited

U.S. PATENT DOCUMENTS

| | | | |
|---|---|---|---|
| 3,303,374 | 2/1967 | Flyer | 385/120 |
| 3,503,666 | 3/1970 | Moore et al. | 385/120 |
| 4,744,627 | 5/1988 | Chande et al. | 385/137 |
| 4,923,275 | 5/1990 | Kaukeinen | 385/115 |
| 4,973,128 | 11/1990 | Hodges | 385/116 |
| 5,109,460 | 4/1992 | Baek et al. | 385/115 |
| 5,121,459 | 6/1992 | Chiang | 385/114 |
| 5,135,590 | 8/1992 | Basavanhally et al. | 385/137 X |

OTHER PUBLICATIONS

"Photochemically Machined, Glass, Ceramic, Optical Fiber Interconnection Components," by J. L. Plawsky et al., *SPIE Optoelectronic Materials, Devices, Packaging, and Interconnects*, vol. 994, 1988, pp. 101–106.

"An All-Optical Implementation of a 3-D Crossover Switching Network," by T. J. Cloonan et al., *IEEE Photonics Technology Letters*, vol. 2, No. 6, Jun. 1990, pp. 438–440.

"InP-Based 4×4 Optical Switch Package Qualification and Reliability," by K. Mizuishi et al., *Technical Digest of Semiconductor Devices Reliability*, NATO Advanced Research Workshop II, Crete, Greece, Jun. 4–9, 1989.

*Primary Examiner*—Brian Healy
*Attorney, Agent, or Firm*—R. B. Anderson

[57] ABSTRACT

A bundle (12) of optical fibers (13) is fixed in a matrix array by apertures in a guiding plate (14) and a securing plate (15). The apertures (18) in the guiding plate are larger than those in the securing plate and the securing plate apertures (17) are funnel-shaped to aid in insertion of the fibers. Each row of optical fibers may be inserted simultaneously by mounting the row on a uniquely designed vacuum holder (26).

5 Claims, 4 Drawing Sheets

OPTICAL FIBER ALIGNMENT APPARATUS INCLUDING GUIDING AND SECURING PLATES

This is a division of application Ser. No. 07/705,229 filed May 24, 1991, now U.S. Pat. No. 5,135,590, granted Aug. 4, 1992.

TECHNICAL FIELD

This invention relates to optical fiber devices and, more particularly, to methods for permanently arranging the ends of optical fibers in a desired configuration.

BACKGROUND OF THE INVENTION

One of the major advances in communications in recent years has been the increased use of optical fiber systems for carrying very large quantities of information with low distortion and low cost over great distances. Optical systems are also promising for such purposes as computing and switching because of the inherently high speeds at which they can be operated. For these reasons, considerable work has been expended to develop convenient techniques for operating directly on transmitting information-carrying light to produce various device functions, that is, without converting such light to electrical energy prior to such operations. The utility of such devices will depend to a great extend on the efficiency and facility with which they can be made.

Optical fibers typically comprise a core of relatively high refractive index glass having a diameter of five microns surrounded by low refractive index glass having a diameter of one hundred twenty-five microns. The paper, "An All-Optical Implementation of a 3-D Crossover Switching Network," by T. J. Cloonan et al., *IEEE Photonics Technology Letters*, Vol. 2, No. Jun. 6, 1990, pp. 438–440, describes a free-space photonics switch which takes light from the end of a bundle of optical fibers, operates on the light so as to perform desired switching functions, and then projects the light into the end of a second array of optical fibers. The optical fiber ends of each bundle from a matrix configuration which must be accurately registered with the other apparatus. Because the size of each fiber, especially the core, is so small, it is important that the ends of each optical fiber bundle be positioned with a great deal of accuracy; fixing the ends of an optic fiber bundle in a desired matrix configuration with the precision needed for such functions as free-space photonics switching is difficult and painstaking.

Because of their importance both to communications and to high-speed computing, there has been a long-felt need in the industry for techniques that can be used to arrange the ends of optical fibers in a desired configuration, that are relatively inexpensive, that do not require a great deal of operator skill, and that are dependably accurate to within micron or sub-micron dimensions.

SUMMARY OF THE INVENTION

Optical fibers are arranged with their ends forming a matrix array by making in a planar securing plate an array of apertures corresponding to the matrix array, and making a similar arrangement of apertures in a planar guiding plate. The end of each optical fiber is then directed first through an aperture in the guiding plate and then through a funnel-shaped aperture in the securing plate. The guiding plate apertures are made sufficiently large so that the fibers can easily be inserted into them and, thereafter, each fiber is directed by the funnel shape of the securing plate through an opening sufficiently small to hold the fiber in a precise spatial relationship with respect to the other fibers. After the fibers have been positioned in the matrix array of apertures in the securing plate, they are filled with epoxy to make a permanent fixture, and the protruding ends of the fiber are ground to be flush with the securing plate. Thereafter, the precisely configured ends of the matrix array of optical fibers may be used, for example, as part of a free-space photonics switching system.

In accordance with one feature of the invention, a vacuum holder is provided for holding a row of parallel optical fibers by a vacuum such that the optical fiber ends protrude from the holder. The optical fibers held by the vacuum holder are then inserted into a row of apertures of the guiding member and then into a corresponding row of apertures in the securing member. During the insertion, light may be projected through the fibers and monitored by a television camera to align the fibers and to assure that none of the fibers have been broken and that they have all been appropriately inserted into the securing member. The vacuum is then released so that the vacuum holder can be removed and another row of optical fibers inserted into it. In this manner, successive rows are formed until the entire matrix array has been completed, at which time all of the fibers are filled with epoxy to form a permanent structure. The optical fibers may initially protrude through the securing member and, after permanent bonding, they are ground such that all of the ends of the matrix array lie on a common plane.

Both the securing member and the guiding member may be made of a material such as glass or ceramic in which the apertures are made by etching so as to develop the preferred shape for guiding the fibers with a minimum of stress. The securing member apertures, for example, are preferably etched from one side of the member to give them funnel shapes. If greater positioning accuracy is required, the securing member may be made of silicon with the apertures being formed by masking and etching along crystallographic planes. The apertures may be made sufficiently small that the fibers cannot initially protrude through them. Then, after insertion of all of the fibers into the securing member apertures, the side of the securing member opposite the guiding member may be polished until the fiber ends are exposed. The polishing may continue until the fiber ends have likewise been polished thereby to make them coplanar. The technique also can facilitate alignment of a lens array to be used with the fiber matrix array.

These and other objects, features and advantages of the invention will be better understood from a consideration of the following detailed description taken in conjunction with the accompanying drawing.

DETAILED DESCRIPTION

Figure 1:
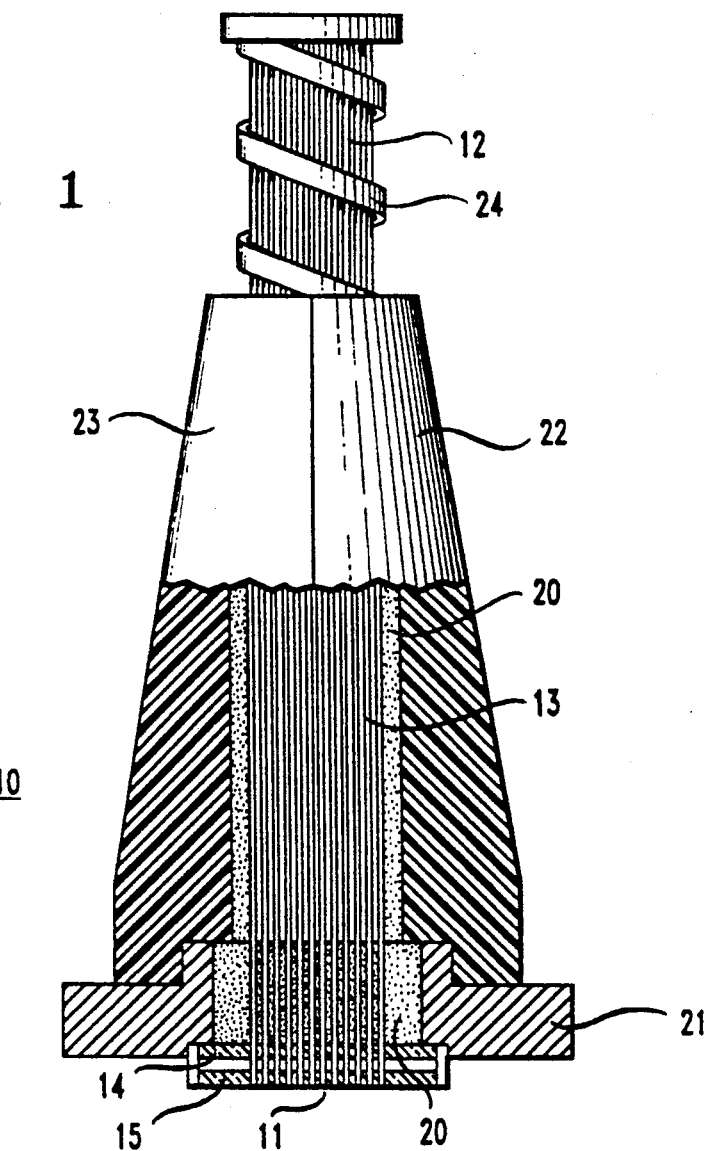
FIG. 1 is a schematic sectional view of an optical fiber array that has been fabricated in accordance with an illustrative embodiment of the invention.

The drawings are not necessarily to scale and certain parts of them have been simplified to aid in clarity of exposition. Referring now to FIG. 1, there is shown apparatus 10 made in accordance with one embodiment of the invention so as to define a matrix array 11 of optical fiber ends. The apparatus comprises an optical fiber bundle 12 made up of a plurality of optical fiber ribbons, each ribbon comprising a row of optical fibers 13 held together by plastic coating. The plastic coating is removed from the ends of individual optic fibers 13 so that the ends can extend through a guiding plate 14 and a securing plate 15.

Figure 2:
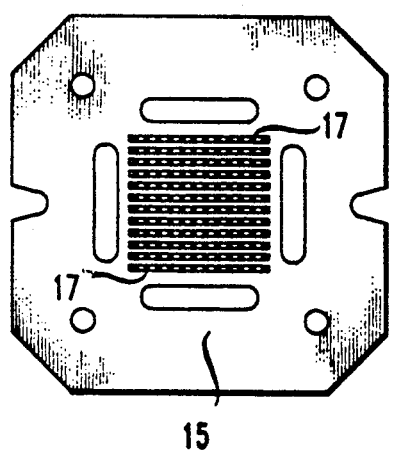
FIG. 2 is a schematic illustration of the securing plate of the apparatus of FIG. 1.
Figure 3:
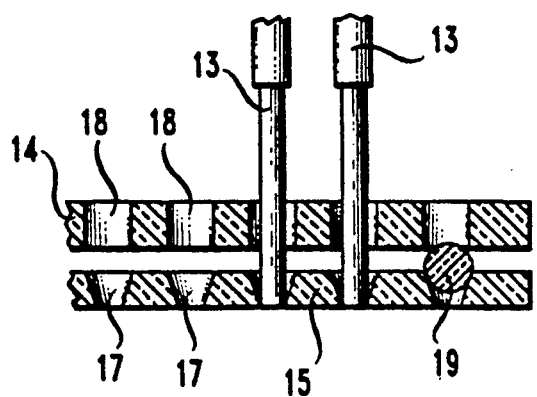
FIG. 3 is a sectional schematic view of part of the securing plate and guiding plate of the apparatus of FIG. 1.

The securing plate 15 is shown in FIG. 2, and it comprises a matrix array of apertures 17, each designed to contain one optic fiber. FIG. 3 is an enlarged sectional view of part of the guiding plate 14 and securing plate 15, and it illustrates how each optic fiber 13 extends through both an aperture 18 of the guiding member as well as an aperture 17 of the securing member 15. The guiding plate and securing plate are aligned such that the aperture arrays are in substantial axial alignment and the plates are spaced conveniently by a plurality of spherical members 19.

Referring again to FIG. 1, the optic fibers 13 are permanently held in place by an epoxy 20 which bonds the separated optic fibers together and also to the guiding member 14 and securing member 15. The epoxy is contained by a cylindrical metal member 21 and a pair of plastic body members 22 and 23. A coil 24 provides strain relief to the optic fiber bundle 12. After assembly, the apparatus 10 holds the ends of the optical fibers 13 in a plane which constitutes a matrix array having the configuration of matrix array 17 of FIG. 2. Such apparatus can be used as part of the free-space photonic switch described in the aforementioned T. J. Cloonan et al. publication.

Referring again to FIG. 3, the guiding plate 14 assists in the assembly of the matrix array of fibers as well as constituting part of the finished product. Each of the apertures 18 has a generally larger diameter than the diameters 17 of the securing plate 15 and therefore fiber insertion in an aperture 18 constitutes a gross alignment of the fiber with a corresponding aperture 17. The apertures 17, in turn, are each funnel shaped so that, when a fiber is inserted into it, it is guided to its proper spatial position in the matrix configuration. After assembly and bonding with epoxy, the guiding plate 14 and securing plate 15 both provide mechanical support to the fiber array and make the device 10 quite robust.

Figure 4:
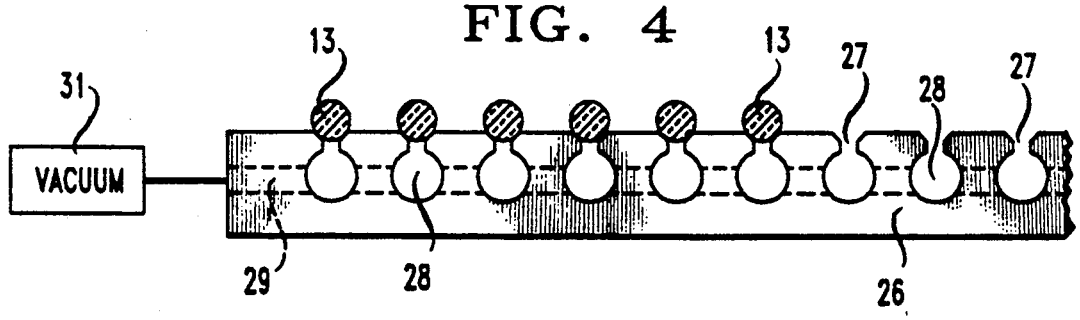
FIG. 4 is a view of a vacuum holder that may be used in assembling the apparatus of FIG. 1.
Figure 5:
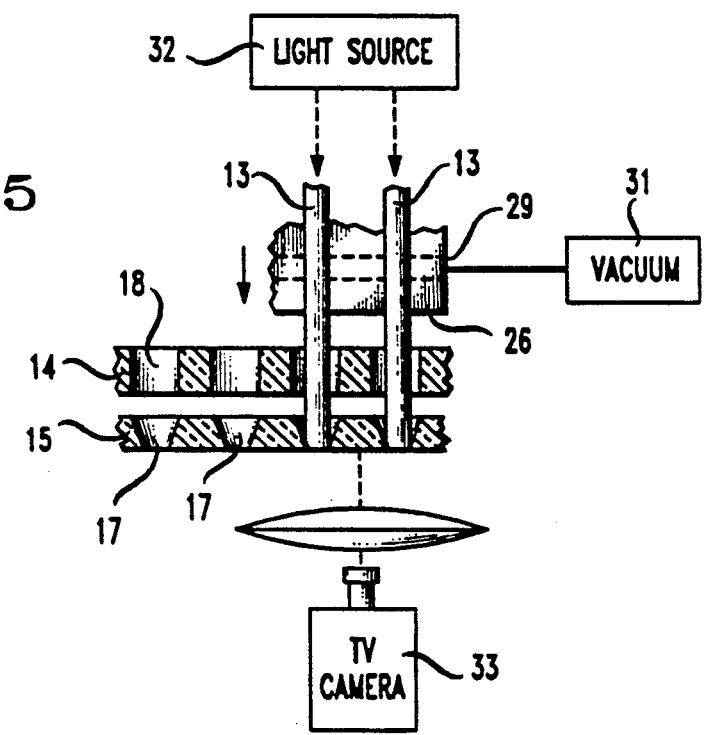
FIG. 5 is a schematic view showing how the vacuum holder of FIG. 5 may be used for inserting fibers into the apparatus of FIGS. 1 and 3.
Figure 6:
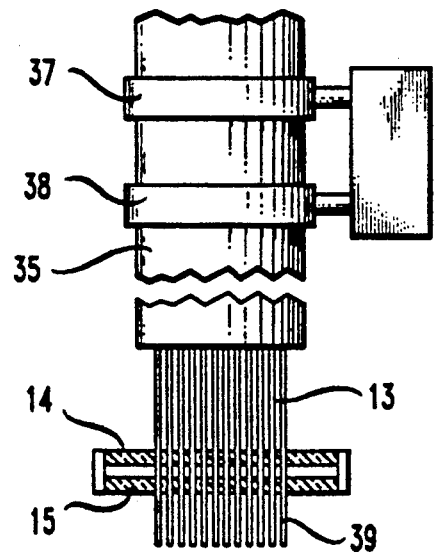
FIG. 6 is a schematic view showing a clamping arrangement for optical fiber ribbons that can be used in assembling the apparatus of FIG. 1.

FIGS. 4, 5, and 6 illustrate how, in accordance with the invention, an entire row of optic fibers can be simultaneously mounted in the guiding and securing plates 14 and 15. Referring to FIG. 4, a vacuum holder 26 is formed comprising a row of grooves 27 for supporting a row of optic fibers 13 shown in section. Each of the grooves 27 communicates with a cavity 28 and each of the cavities 28 communicates with a channel 29 that extends along the vacuum holder 26. The optic fibers 13 are held in the grooves by a vacuum applied to the channel 29 by vacuum apparatus 31.

As shown schematically in FIG. 5, the optical fibers 13 are held in the holder 26 such that the ends protrude over one edge. The holder 26 may rest on a vertical stage (not shown) while guiding plate 14 and securing plate 15 are mounted on metal member 21 which is clamped to an x-y table (not shown). Light from a source 32 is directed into the optic fibers 13 and is observed by a closed circuit TV camera 33. The operator views a magnified image of the fiber ends on a TV display (not shown) and adjusts the x-y table to align the apertures in plates 14 and 15 with the row of optical fibers. When the fibers are appropriately aligned with the apertures, the operator operates the vertical stage to move the vacuum holder in the direction of the arrow so as to insert the ends of fibers 13 through apertures 18 and 17 of guiding plate 14 and securing plate 15, respectively. After a row of optical fibers has been inserted as shown, the optical fibers are held in place by a clamp and the vacuum source 31 is switched to remove the vacuum. Holder 26 is then moved with respect to plates 14 and 15 to a position for receiving another row of optical fibers. The next row of optical fibers is inserted in the vacuum holder, the vacuum is reapplied, and the next row of fibers is inserted through apertures 18 and 17. This procedure is repeated until the entire matrix array of fiber ends has been mounted.

Referring to FIG. 6, the optical fibers 13 may be part of an optical fiber ribbon 35, which, as is known, comprises a row of optical fibers held together by a plastic coating. The plastic ribbons may be held by a pair of clamps shown schematically at 37 and 38. After the fibers of each successive ribbon have been inserted through guiding plate 14 and securing plate 15, the ribbon may then be clamped to ribbon 35 by successively clamping it first to one of the clamps 37, 38 and then to another. By using two clamps, successive ribbons can be added to an array of ribbons without disturbing the array of ribbons previously mounted. The entire succession of ribbons may constitute the optical fiber bundle 12 of FIG. 1. After the insertion steps, optical fiber ends 39 may protrude a significant distance beyond the securing plate 15, as shown. When the assembly is filled with epoxy and the structure shown in FIG. 1 is assembled, the ends 39 may likewise be bonded together with epoxy, and thereafter they can be ground off to be flush with the planar surface of securing member 15. The epoxy bond maintains the relative positions of the ends 39 during the polishing and reduces the chances of spurious breaking or cracking of the fibers by providing structural reinforcement.

Figure 7:
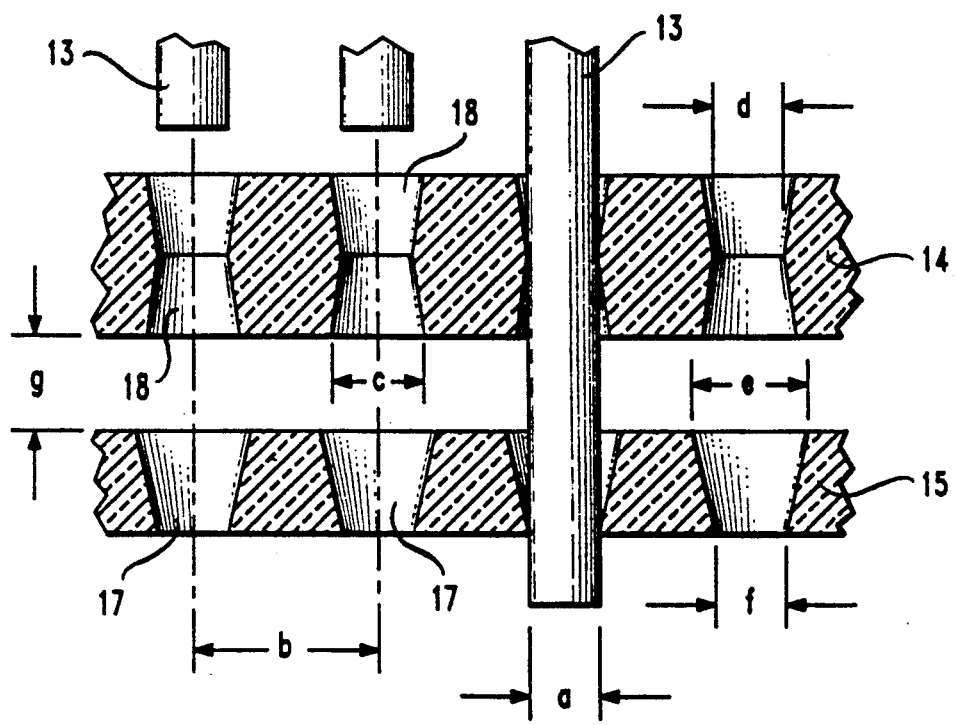
FIG. 7 is a schematic view of part of a securing member and guiding member that may be used in the apparatus of FIG. 1.

In one prototype construction of the apparatus 10 of FIG. 1, the matrix array comprised eighteen rows, each having thirty-six optical fibers. Referring to FIG. 7, the diameter a of each optical fiber 13 may be one hundred twenty-five microns, which is the dimension of commercially available fibers. The center-to-center spacing b of successive fibers may be two hundred sixty-two microns. Both the guiding plate 14 and the securing plate 15 may be made of Fotoform (TM), a glass plate material available from the Corning Glass Works of Corning, New York. Apertures 18 in the guiding plate 14 may be made by photolithographic masking and etching from opposite sides of the plate. Etching from both surfaces inwardly leaves each aperture with an hourglass configuration, typically having a large diameter c of two hundred microns and a small diameter d at the center of guiding plate 14 of approximately one hundred thirty-five microns. Guiding plate 14 may have a thickness of forty mils, and securing member 15 a thickness of thirty mils (seven hundred fifty microns). The securing plate 15 is preferably etched only from its upper surface so as to give a pronounced funnel shape to apertures 17. The upper surface of each aperture may have a diameter e of one hundred seventy-eight to one hundred eighty-two microns and a lower surface diameter f of one hundred twenty-seven to one hundred thirty microns.

It can be seen that apertures 18 are generally larger than apertures 17 since their principal function is to guide the fibers 13 to be aligned with apertures 17, and the larger the aperture, the easier is the initial insertion of the fibers. Apertures 18 should not be so large that they do not constitute a reliable alignment with apertures 17. Apertures 17 should preferably have a pronounced funnel configuration to permit easy insertion in the upper surface while having a sufficiently small diameter at the lower surface to constrain the position of the fiber tips in the matrix configuration. The separation g of the two plates is not critical and may, for example, be two hundred fifty microns. Referring to FIG. 3, the use of several glass spheres 19 mounted in apertures in the two plates as shown is a convenient method for obtaining a predictable spacing, since the apertures and glass spheres can easily be made with a great deal of precision and uniformity.

Referring again to FIG. 4, it is important to make the vacuum holder 26 sufficiently precise that it holds fibers 13 in a common plane for simultaneous insertion into the apertures. Cavities 28 and channel 29 can be formed in steel by electron discharge machining, which involves the formation of an electronic discharge by a wire that then cuts through the steel in a manner similar to that of a jig-saw. Electron discharge and other forming methods that may be used are matters that are well understood in the art and therefore have not been described in detail. The total thickness of a holder 26 that was made was sixteen mils.

Figure 8:
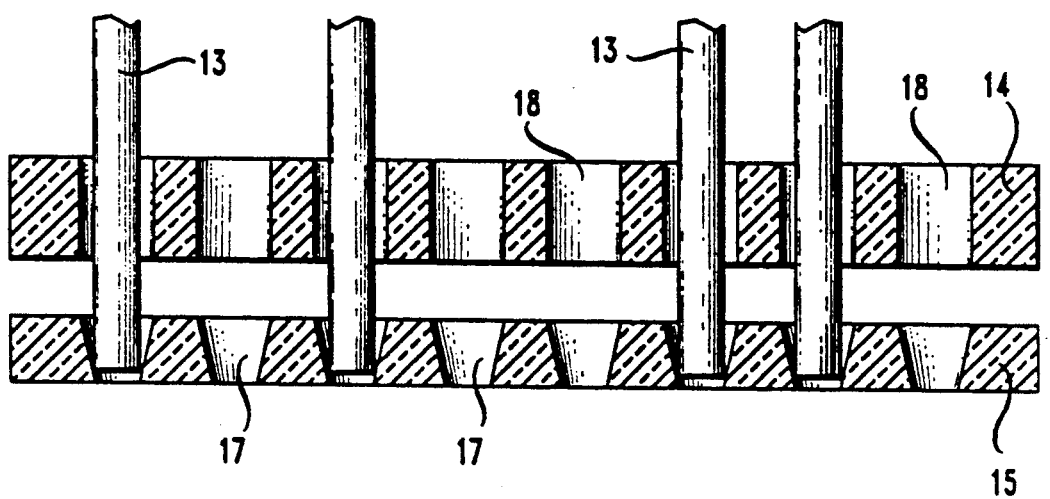
FIG. 8 is a schematic view of part of an optical fiber array fabricated in accordance with another embodiment of the invention.
Figure 9:
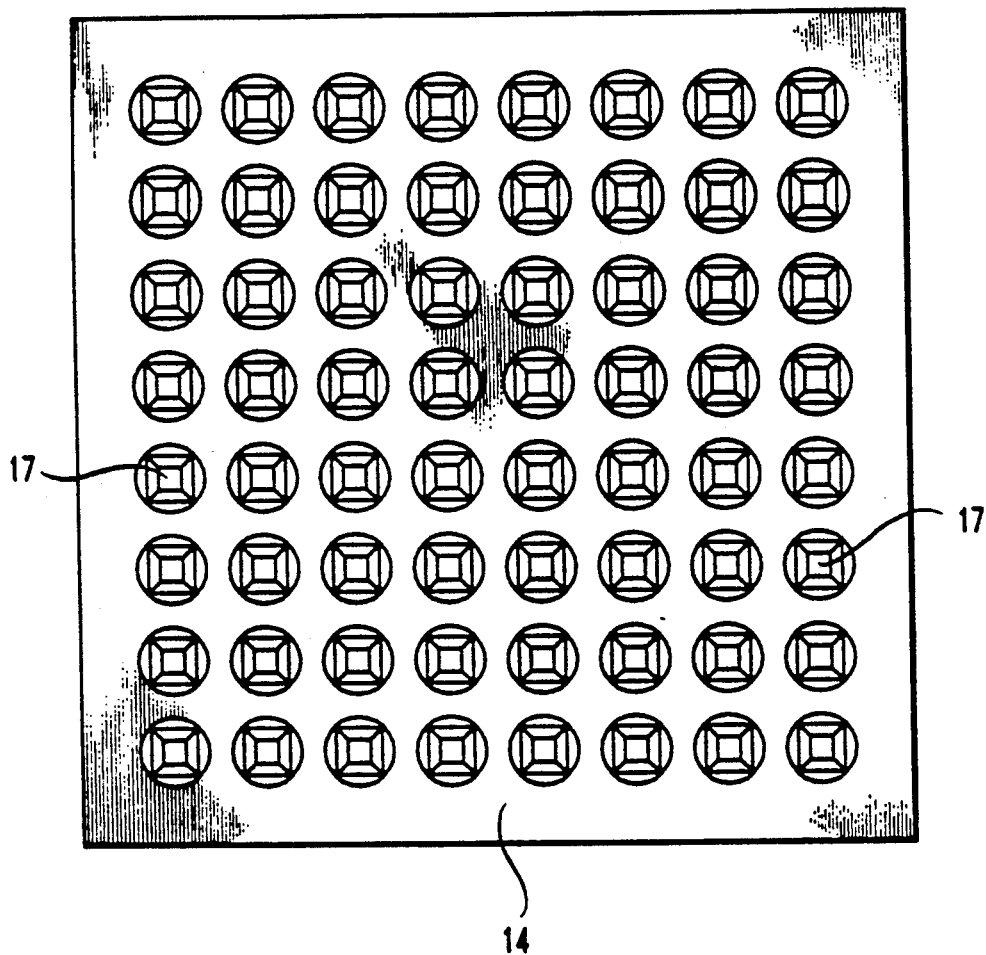
FIG. 9 is a view of the guiding plate and securing plate apertures of the apparatus of FIG. 8.

Referring to FIGS. 8 and 9, there is shown another embodiment of the invention which may be used if the alignment tolerances are even more critical than those of the embodiment of FIG. 1. The main difference is that the securing member 15 is made of silicon and the apertures 17 are made by etching from the upper surface of the silicon securing member. The silicon securing member 15 is conventional <100> silicon which inherently etches along crystallographic planes at an angle of 54.7 degrees with respect to the horizontal. FIG. 9 is a top view, looking through guiding plate 14 to the apertures 17 in the securing plate 15. The apertures are defined by trapezoidal side walls with rectangular openings at the bottom, as shown. It is known from the silicon micro-machining art that such apertures can be made with sub-micron precision using standard photolithographic mask and etch techniques. As a consequence, the fibers 13, when abutted at their ends against the sides of the apertures 17 as shown in FIG. 8, will necessarily be extremely precisely located. That is, there is a complete restraint of movement of the end of each optical fiber in any horizontal direction.

After insertion, the optic fibers 13 can be fixed by epoxy, as described before. The apparatus of FIG. 8 may then be used as shown with the light being emitted from the bottom of each aperture 17. Alternatively, silicon securing member 15 may have its bottom surface polished to become flush with the ends of fibers 13. The fiber ends may be polished along with the securing member 15 to insure coplanarity of the end surfaces of the fibers.

In embodiments that were made, the guiding member 14 was one millimeter thick and was made of a ceramic version of Fotoform (TM) material. The eight by eight array was positioned with great precision by virtue of the silicon securing means. The silicon securing member was five hundred eight microns thick, which was too thick to make a complete penetration by the etched apertures. Rather, cavities having the characteristic 54.7 degree slope were etched that were one hundred forty-one microns deep and two hundred microns across at the upper surface. After the optical fibers were inserted, the wafer was polished sufficiently on the side opposite the cavities to reach the cavities and to polish slightly the ends of the fibers which were positioned with precise center-to-center spacing in the matrix. It should be noted that terms such as "aperture" and "diameter" as used herein are intended to apply to non-circular as well as circular openings. Likewise, the optical fiber need not necessarily be of a cylindrical shape.

The various embodiments that have been described are intended to be merely illustrative of the different ways in which the invention can be used. The guiding means and the securing means can be made of any of various materials other than glass, ceramic and silicon that have been described, including molded polymer. Etching the guiding means from opposite sides is advantageous, but not essential, and the apertures can be made in various other ways such as drilling. The invention may be used for arranging optical fiber ends in configurations other than a matrix configuration. Wherever the relative positions of the ends of optical fibers are important, the invention may be advantageous. A matrix array of lenses having a configuration corresponding to that of the ends of the fibers may be used to collimate and/or direct the output beam or to focus incoming lightwave information. Various other embodiments and modifications may be made by those skilled in the art without departing from the spirit and scope of the invention.

We claim:

1. An optical device comprising:
   a bundle of optical fibers;
   a planar securing member having therein a first array of first apertures;
   a planar guiding member having therein a second array of second apertures;
   the securing member and guiding member being substantially parallel with the first and second arrays of apertures being in substantial axial alignment;
   each of said first apertures and said securing member having a wider dimension on the side of the securing member facing the guiding member than on the side of the securing member remote from the guiding member;
   each optical fiber having a first end portion extending through the guiding member and then into the securing member;

the first end portions of the optical fibers being bonded together and to the guiding member and the securing member by a bonding medium.

2. The device of claim 1 wherein:

free ends of the first end portions of the optical fiber bundle lie substantially in a common plane.

3. The device of claim 2 wherein:

the free ends are substantially flush with a surface of the securing member opposite the guiding member.

4. The device of claim 1 wherein:

the free ends of the optical fibers are arranged in a matrix array comprising a plurality of rows of fibers;

second end portions of each row of fibers opposite the free ends are interconnected as part of an optical fiber ribbon;

the first end portion of each optical fiber is separated from its corresponding optical fiber ribbon.

5. An optical device comprising:

a bundle of optical fibers;

a planar securing member having therein a first array of first apertures;

a planar guiding member having therein a second array of second apertures, each of the second apertures having a substantially hour-glass configuration;

the securing member and guiding member being substantially parallel with the first and second arrays of apertures being in substantial axial alignment;

each optical fiber having a first end portion extending through the guiding member and then into the securing member;

the first end portions of the optical fibers being bonded together and to the guiding member and the securing member by a bonding medium.

* * * * *